US006420817B1

(12) United States Patent
Ricci-Ottati et al.

(10) Patent No.: US 6,420,817 B1
(45) Date of Patent: Jul. 16, 2002

(54) METHOD FOR DETECTING INJECTION EVENTS IN A PIEZOELECTRIC ACTUATED FUEL INJECTOR

(75) Inventors: Giulio Angel Ricci-Ottati, Burton; Russell Harmon Bosch, Gaines, both of MI (US); Kenneth David Mowery, Noblesville, IN (US); Martin Paul Hardy, Gillingham; Andrew John Hargreaves, Faversham, both of (GB)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/614,153

(22) Filed: Jul. 11, 2000

Related U.S. Application Data

(60) Provisional application No. 60/182,090, filed on Feb. 11, 2000.

(51) Int. Cl.$^7$ ........................ F02M 37/08; H01L 41/083
(52) U.S. Cl. .................................... 310/316.01; 123/498
(58) Field of Search ....................... 310/316.01; 123/498

(56) References Cited

U.S. PATENT DOCUMENTS

| | | | | |
|---|---|---|---|---|
| 4,469,974 A | * | 9/1984 | Speranza ............... | 310/316.01 |
| 4,537,353 A | * | 8/1985 | Speranza ............... | 310/316.01 |
| 4,649,886 A | * | 3/1987 | Igashire et al. ............. | 123/498 |
| 4,669,440 A | | 6/1987 | Takase et al. ................ | 123/494 |
| 4,826,080 A | | 5/1989 | Ganser ......................... | 239/88 |
| 4,841,936 A | * | 6/1989 | Takahashi .................... | 123/447 |
| 5,130,598 A | * | 7/1992 | Verheyen et al. ....... | 310/316.01 |
| 6,037,701 A | * | 3/2000 | Atsuta .................... | 310/316.01 |
| 6,121,714 A | * | 9/2000 | Atsuta .................... | 310/316.01 |
| 6,253,736 B1 | * | 7/2001 | Crofts et al. ................. | 123/498 |
| 6,286,484 B1 | * | 9/2001 | Niethammer et al. ....... | 123/447 |

FOREIGN PATENT DOCUMENTS

| | | | | |
|---|---|---|---|---|
| DE | 3103061 | 8/1982 | ........... | H01L/41/08 |
| DE | 19939456 | 11/2000 | ........... | F02D/41/30 |

\* cited by examiner

*Primary Examiner*—Thomas M. Dougherty
(74) *Attorney, Agent, or Firm*—Thomas N. Twomey

(57) ABSTRACT

A method is provided for detecting injection events in a piezoelectric actuated fuel injector. The method comprises the steps of: (a) providing a piezoelectric element for actuating the injector valve; (b) applying a voltage to the piezoelectric element, thereby actuating the injector valve; and (c) monitoring at least one of the voltage or current associated with the piezoelectric element, wherein changes in voltage or current are indicative of injection events in the fuel injector.

13 Claims, 6 Drawing Sheets

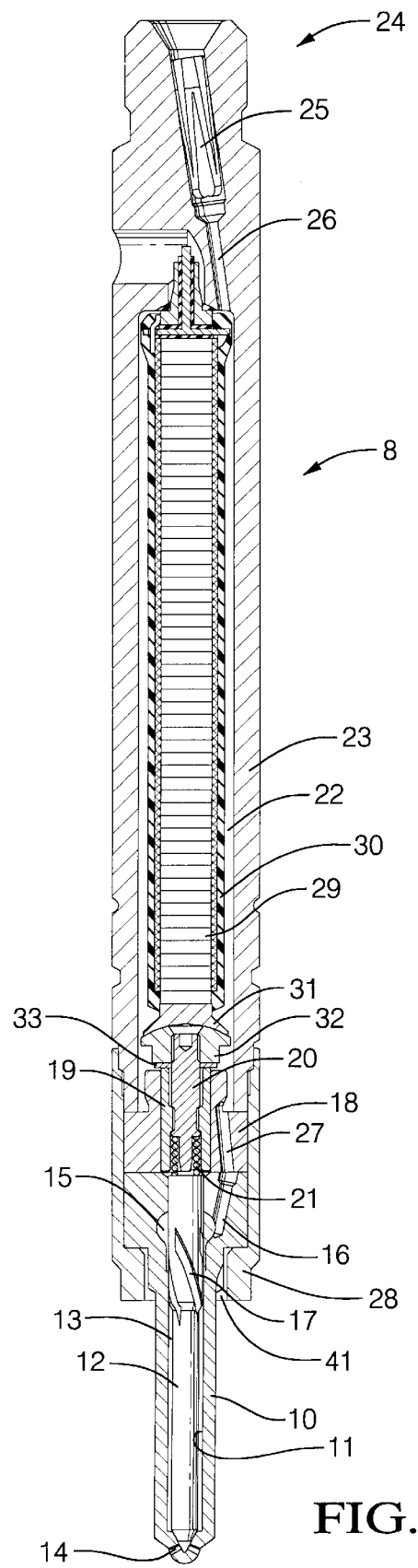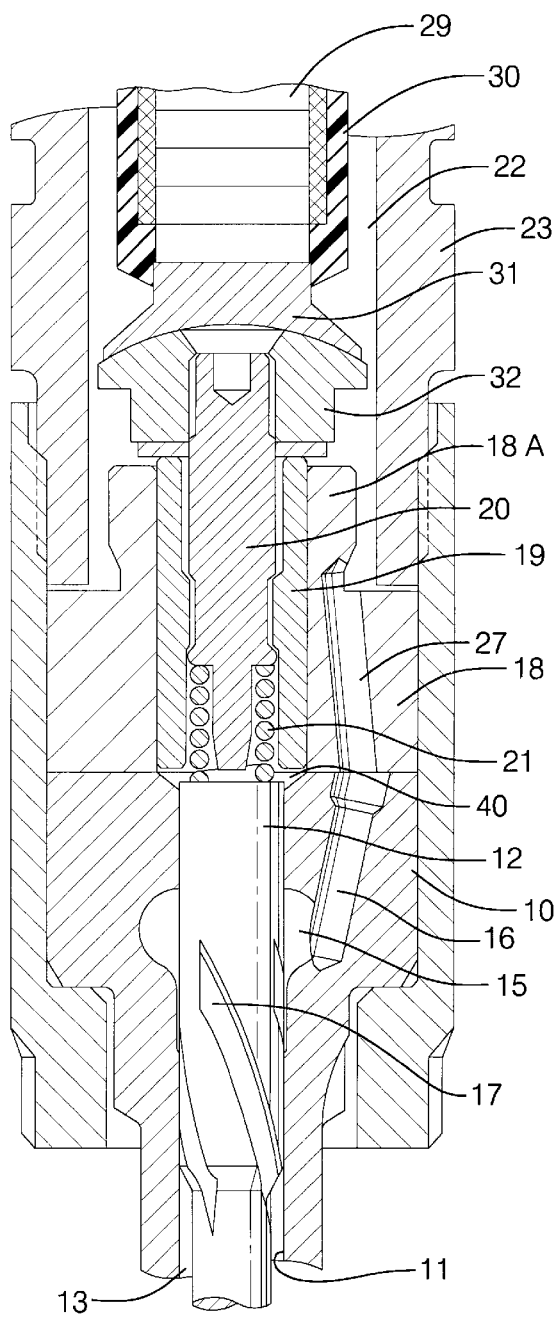
FIG. 2
FIG. 3A

METHOD FOR DETECTING INJECTION EVENTS IN A PIEZOELECTRIC ACTUATED FUEL INJECTOR

The benefit of a provisional application U.S. Ser. No. 60/182,090, filed Feb. 11, 2000, entitled DRIVE SCHEME TO USE PIEZOELECTRIC ACTUATOR AS AN INJECTION EVENT SENSOR is hereby claimed.

TECHNICAL FIELD

The present invention relates generally to a piezoelectric actuated fuel injector for use in conjunction with an internal combustion engine and, more particularly, to a method for detecting injection events in a piezoelectric actuated fuel injector.

BACKGROUND OF THE INVENTION

Fuel injectors for high pressure injection of fuel directly into the combustion chamber of the engine generally use a guided needle-type injector valve which seals against the valve seat, thereby closing the fuel discharge openings. In the open position, the injector valve axially separates from the valve seat, thereby allowing fuel flow out of the discharge openings into the combustion chamber. In order to minimize emissions and improve combustion efficiencies, engine manufactures are adamant in their desire to establish control over the timing and rate at which fuel is injected through the discharge openings and into the combustion chamber of the engine.

Conventional fuel injectors use a magnetic solenoid to actuate the injector valve. However, solenoid actuated fuel injectors introduce a significant delay between the drive voltage application and event performance which in turn may prevent meaningful control over the rate of injection.

Alternatively, fuel injectors may use piezoelectric actuator to actuate the injector valve. In one instance, the injector valve is quasi-directly actuated by a piezoelectric actuator. In the another instance, the injector valve is actuated through the use of fluid pressure acting on the valve. A control chamber is used to store the fluid that acts on the injector valve, whereby changes in the fluid pressure actuate the injector valve. A control valve that controls the fluid pressure in the chamber is actuated by a piezoelectric actuator. In order to establish meaningful control over the timing and rate of injection, it is desirable to provide a method for detecting injection events in a piezoelectric actuated fuel injector.

SUMMARY OF THE INVENTION

In accordance with the present invention, a method is provided for detecting injection events in a piezoelectric actuated fuel injector. The method comprises the steps of: (a) providing a piezoelectric element for actuating the injector valve; (b) controlling a voltage applied to the piezoelectric element, thereby actuating the injector valve; and (c) monitoring at least one of the voltage or current associated with the piezoelectric element, wherein changes in voltage or current are indicative of injection events in the fuel injector.

For a more complete understanding of the invention, its objects and advantages, refer to the following specification and to the accompanying drawings.

BRIEF DESCRIPTION OF THE DRAWINGS

FIG. 2 is a cross-sectional view of a first exemplary piezoelectric actuated fuel injector in which the piezoelectric device quasi-directly actuates the injection valve;

FIG. 4 is a graph illustrating the voltage associated with a piezoelectric actuator during an injection event in the first exemplary piezoelectric actuated fuel injector;

DESCRIPTION OF THE PREFERRED EMBODIMENT

A piezoelectric actuator exhibits electrical characteristics similar to those of a capacitor. If a voltage is applied to a piezoelectric actuator, the piezoelectric actuator will retain its electric charge. Additionally, when the voltage is applied to the piezoelectric actuator, it will experience a change in length that is proportional to the applied voltage. After the applied voltage is discharged from the piezoelectric actuator, it will return to its initial length. In this way, the piezoelectric actuator may be used to actuate the injector valve of a fuel injector.

Figure 1:
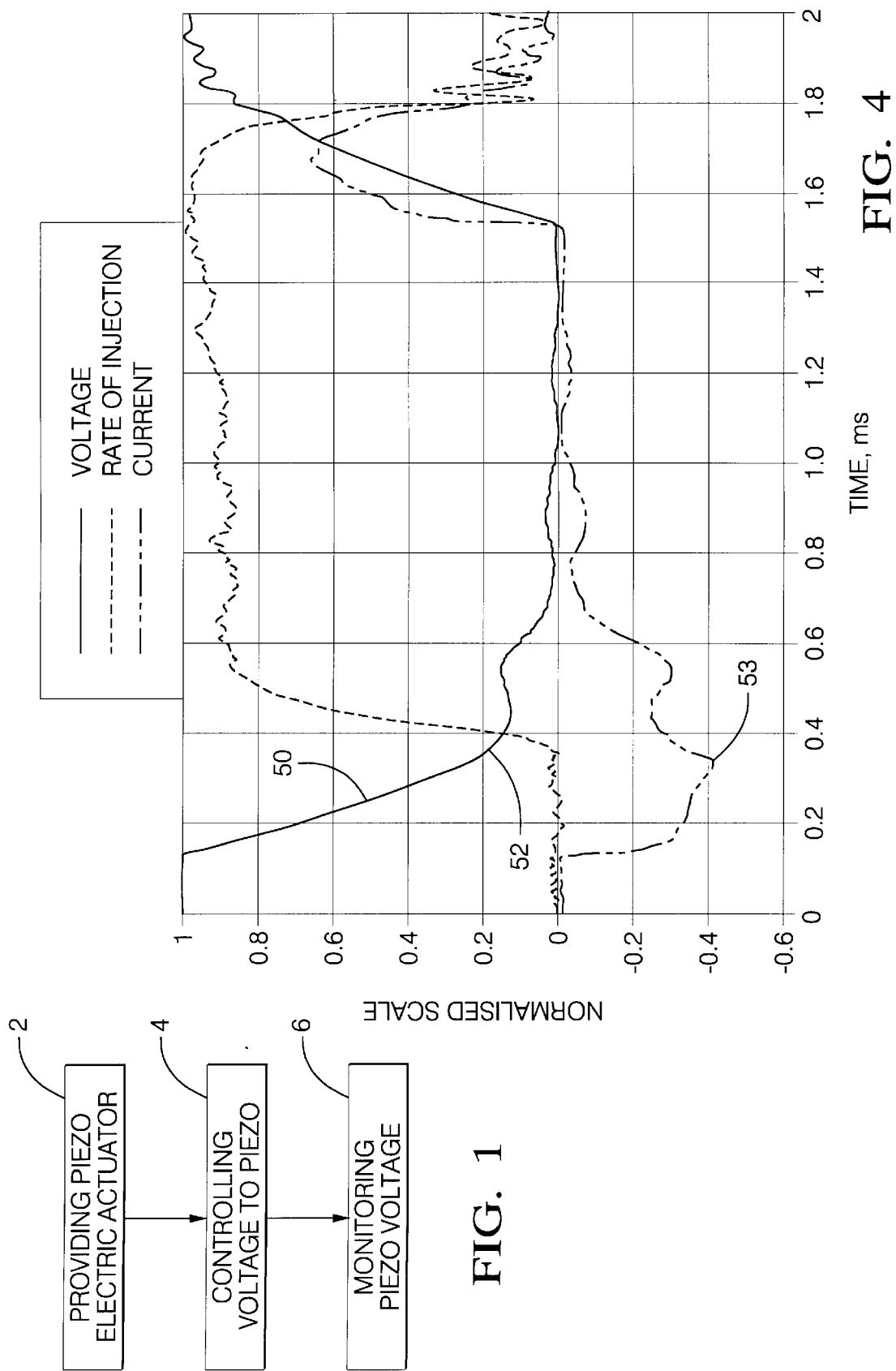
FIG. 1 is a flowchart of a method for detecting injection events in a piezoelectric actuated fuel injector in accordance with the present invention.

Moreover, when a mechanical load is applied to the piezoelectric actuator, it will generate an electric charge, such that the electric charge is proportional to the mechanical load. Again, the electric charge will be retained so long as the mechanical load is applied to the piezoelectric actuator. As will be more fully explained below, the mechanical load applied to a piezoelectric actuator is indicative of injection events in the fuel injector. In accordance with the present invention, a method for detecting injection events using a piezoelectric actuated fuel injector is depicted in FIG. 1. The method comprising the steps of: (a) providing a piezoelectric element 2 for actuating the injector valve; (b) controlling a voltage 4 applied to the piezoelectric element, thereby actuating the injector valve; and (c) monitoring the voltage 6 associated with the piezoelectric element, wherein changes in voltage are indicative of injection events in the fuel injector.

For purposes of this discussion, an exemplary piezoelectric actuated fuel injector is illustrated in FIG. 2. The fuel injector 8 generally includes an injector body 10 having an axially extending fuel passage therein, an injector valve 12 reciprocably movable within the fuel passage and a piezoelectric actuator for actuating the injector valve 12. While the following description is provided with reference to a particular fuel injector, it is readily understood that the broader aspects of the present invention are applicable to other types of and/or configurations for piezoelectric actuated fuel injectors.

In FIG. 2, the injector valve is reciprocably movable in a bore 11 within the injector body 10. The injector valve 12 is shaped for engagement with a valve seat. More specifically, the injector valve 12 is defined to include a relatively large diameter region which is of a diameter substantially equal to the adjacent part of the bore 11 for guiding the sliding movement of the injector valve 12 as well as a reduced diameter portion which defines a delivery chamber 13. It will be appreciated that engagement of the injector valve 12 with the valve seat controls communication between the delivery chamber 13 and one or more outlets openings 14 located downstream of the seating.

The bore 11 is shaped to define an annular gallery 15 which communicates with a passageway 16 provided in the injector body 10. The injector valve 12 is provided with flutes 17 defining flow paths between the annular gallery 15 and the delivery chamber 13. The injector valve 12 defines an angled step at the interconnection of the relatively large and smaller diameter regions thereof, the step forming a thrust surface which is exposed to the fuel pressure within the delivery chamber 13 such that when fuel under high pressure is applied to the delivery chamber 13, the action of the fuel applies a force to the injector valve 12 urging the injector valve 12 away from its seating. The exposed end surface of the injector valve 12 similarly forms a thrust surface against which fuel under pressure may act to urge the injector valve towards its seating.

Figure 3:
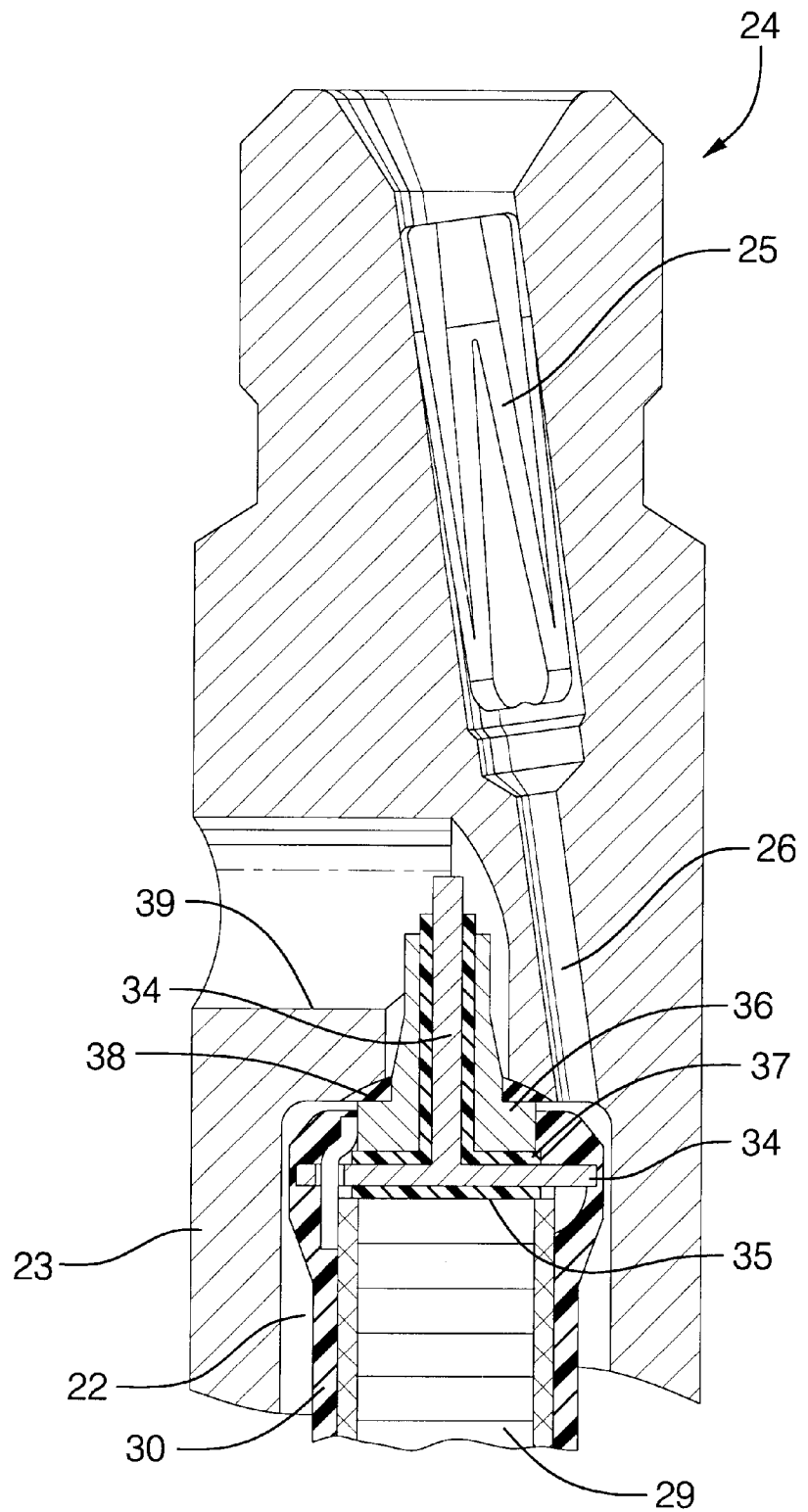
FIGS. 3A and 3B are fragmentary cross-sectional views of the first exemplary piezoelectric actuated fuel injector.

Referring to FIG. 3A, the injector body 10 abuts a distance piece 18 provided with a through bore within which a piston member 19 of tubular form is slidable. A screw-threaded rod 20 is engaged within a passage defined by the tubular piston member 19. A spring 21 is engaged between the screw-threaded rod 20 and the end surface of the injector valve 12. The spring 21 applies a biasing force to the injector valve 12, thereby urging the injector valve 12 towards its seating. It will be appreciated that for a given position of the piston member 19, adjustment of the axial position of the screw-threaded rod 20 by rotating the rod 20 relative to the piston member 19 will vary the spring force applied by the spring 21 to the injector valve 12. The purpose of the spring is to provide seat sealing force when the rail pressure is low, e.g., after engine shut down.

The distance piece 18 abuts an end of an actuator housing 23 which is of elongate form and is provided with a bore defining an accumulator 22. The actuator housing 23 is provided with an inlet region 24 arranged to be coupled to a high pressure fuel line (not shown) to permit connection of the fuel injector to a source of fuel under high pressure, for example a common rail charged to an appropriate high pressure by a suitable high pressure fuel pump. The inlet region 24 houses an edge filter member 25 to remove particulate contaminants from the flow of fuel to the injector, thereby reducing the risk of damage to the various components of the injector or blockage of the spray holes. The clean side the edge filter member 25 communicates through a drilling 26 with the accumulator 22. A passageway 27 provided in the distance piece 18 permits communication between the accumulator 22 and the passageway 16 provided in the injector body 10. A threaded nut 28 is used to secure the injector body 10 and the distance piece 18 to the actuator housing 23.

A piezoelectric actuator 29 is located within the accumulator 22. The piezoelectric element 29 may be provided with a coating 30 which is elastically compliant, electrically insulating and hydraulically sealing. The coating acts to reduce risk of breakdown of insulation between areas of high voltage potential that arises due to residual water content in the fuel. The coating 30 also acts to prevent or restrict the ingress of fuel into the joints between the individual tiles forming the piezoelectric element, thus reducing the risk of damage to the piezoelectric element 29. Further, as the piezoelectric element 29 is subject to the compressive load applied by the fuel under pressure, the risk of propagation of cracks is reduced. The piezoelectric element 29 carries, at its lower end, an anvil member 31 which is shaped to define a part-spherical recess. A load transmitting member 32 includes a region of part-spherical form that extends into the part-spherical recess of the anvil member 31. The load transmitting member 32 is provided with an axially extending, screw-threaded passage which is engaged by the screw-threaded rod 20. A spacer or shim 33 is located between the load transmitting member 32 and the adjacent face of the tubular piston member 19 to control the spacing of these components. The screw threaded rod 20 is shaped to receive a tool for use in rotating the rod 20 to adjust the spring force applied to the injector valve 12.

The radius of curvature of the part-spherical surface of the load transmitting member 32 is slightly greater than that of the part-spherical recess of the anvil member 31. It will be appreciated, therefore, that the engagement between these components occurs around a substantially circular sealing line adjacent the outer periphery of the anvil member 31 and that a small volume is defined between these components. The cooperation between the anvil member 31 and load transmitting member 32 is such as to define an imperfect seal between these components, the seal being sufficient to restrict the rate at which fuel can flow to the volume defined therebetween from the accumulator 22.

The end surface of the injector valve 12 which engages the spring 21 is exposed to the fuel pressure within a control chamber 40 defined between the injector body 10, the distance piece 18, the piston member 19 and the screw-threaded rod 20. It will be appreciated that the fuel pressure within the control chamber 40 assists the spring 21 in applying a force to the injector valve 12, thereby urging the injector valve 12 towards its seating.

As best seen in FIG. 3B, the upper end of the piezoelectric element 29 is secured to a first terminal member 34 using an appropriate adhesive. An insulating spacer member 35 is also located between the first terminal member 34 and the end surface of the piezoelectric element 29. A second, outer terminal member 36 surrounds a stem 34A of the first terminal member 34. Another insulator member 37 is then located between the first and second terminal members. Again, a suitable adhesive is conveniently used to secure these integers to one another. A seal member 38 engages around part of the second terminal member 36. The seal member 38 includes a surface of part-spherical form which is arranged to seat within a correspondingly shaped recess formed around a drilling which opens into an end of the accumulator 22 in order to compensate for slight misalignments and manufacturing inaccuracies. The first and second terminals 34, 36 extend into a radial drilling 39 provided in the actuator housing 23 whereby appropriate electrical connections can be made to permit control of the piezoelectric actuator. The fuel pressure within the accumulator assists the adhesive in retaining the various components in position.

In accordance with the present invention, injection events are detected by monitoring the voltage associated with the piezoelectric actuator 29. To the extent that the applied voltage is constant, the voltage changes associated with the piezoelectric actuator 29 are proportional to a mechanical load exerted by the fuel pressure in the control chamber 40. In order to detect voltage changes in the piezoelectric actuator 29, a conventional voltage detection circuit (herein referred to as an injection event detector) as is known in the art may be electrically connected to the terminals of the piezoelectric actuator 29. It is also envisioned that injection events may be detected by monitoring the current associated with the piezoelectric actuator. In this case, a conventional current measurement may be employed. In this way, changes in the control pressure exerted on the piezoelectric actuator 29 are detectable as changes in the voltage associated with the piezoelectric actuator 29.

Prior to an injection event, the piezoelectric actuator 29 occupies an energized state. In this state, the piezoelectric actuator 29 experiences longitudinal growth, such that the injector valve 12 remains in sealing engagement with its seating. More specifically, the piezoelectric actuator 29 forces the piston member 19 to occupy a position in which the fuel within the control chamber 40 is pressurized to an extent sufficient to ensure that the force applied to the injector valve 12 by the fuel within the control chamber 40 in conjunction with the action of the spring 21 is sufficient to hold the injector valve 12 in engagement with its seating. Thus, there is no injection of fuel into the combustion chamber.

To initiate fuel injection, the voltage applied to the piezoelectric actuator 29 is reduced, thereby reducing the axial length of the piezoelectric actuator 29. Since the upper end of the actuator 29 is held in a fixed position relative to the actuator housing 23, the change in length results in an upward movement of the lower end of the piezoelectric actuator 29. The movement of the piezoelectric actuator 29 is transmitted to the anvil 31 which in turn causes movement of the load transmitting member 32. Since the control piston member 19 is secured to the load transmitting member 32, the change in the axial length of piezoelectric actuator 29 results in movement of the piston member 19, thereby increasing the volume of the control chamber 40 and hence reducing the fuel pressure acting upon the injector valve 12.

Referring to FIG. 4, the reduction in voltage applied to the piezoelectric actuator 29 is shown at 50. As the pressure in the control chamber 40 reaches some threshold level, the injector valve 12 begins to axially separate from its seating. The movement of the injector valve 12 slows the increase in the volume of the control chamber 40. As a result, there is a slight increase in the fuel pressure exerted on the piezoelectric actuator 29 that causes a decrease in the voltage discharge rate associated with the piezoelectric actuator 29 as shown at 52. Thus, this change in rate relates to the movement of the injector valve 12 which signifies the beginning of fuel injection. The beginning of injection is also detected by monitoring the current associated with the piezoelectric actuator 29 is shown at 53. As would be expected by one skilled in the art, the current more clearly indicates this injection event because the current is proportional to the derivative of the voltage, i=Cdv/dt. It is envisioned that other injection events may be detected during injection by monitoring the voltage and/or current associated with the piezoelectric actuator 29.

To terminate fuel injection, the piezoelectric actuator 29 is returned to its original energized state. As a result, the anvil 31 and load transmitting member 32 are pushed in a downward direction returning the piston member 19 to substantially its original position. The fuel pressure within the control chamber 40 increases, thereby applying a greater magnitude of force onto the injector valve 12. At some point, the fuel pressure in the control chamber 40 in conjunction with the spring 21 are able to return the injector valve 12 into sealing engagement with its seating, thereby completing fuel injection.

Figure 5:
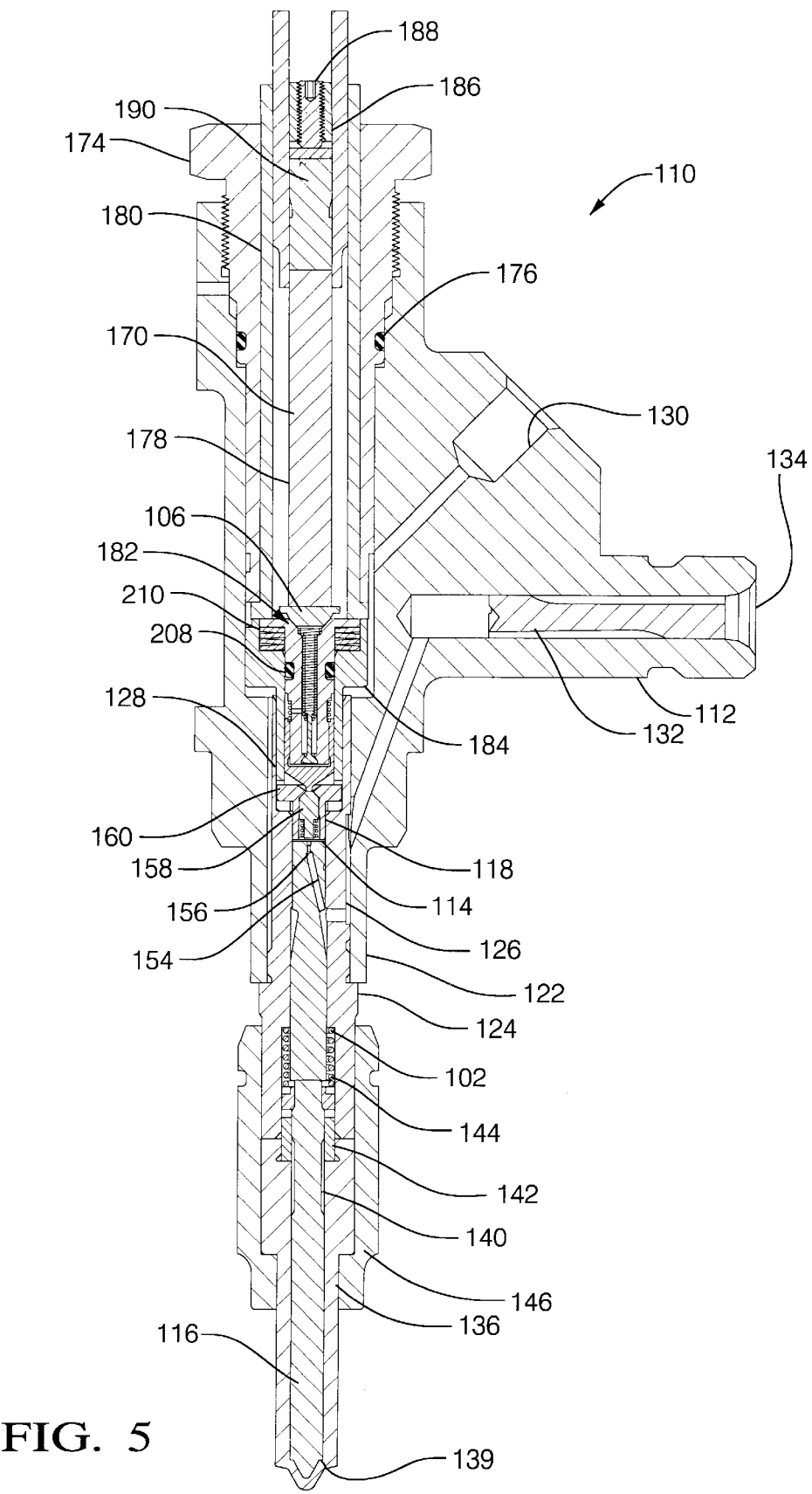
FIG. 5 is a cross-sectional view of a second exemplary piezoelectric actuated fuel injector in which the injector valve is actuated through the use of fluid pressure acting on the injector valve.
Figure 6:
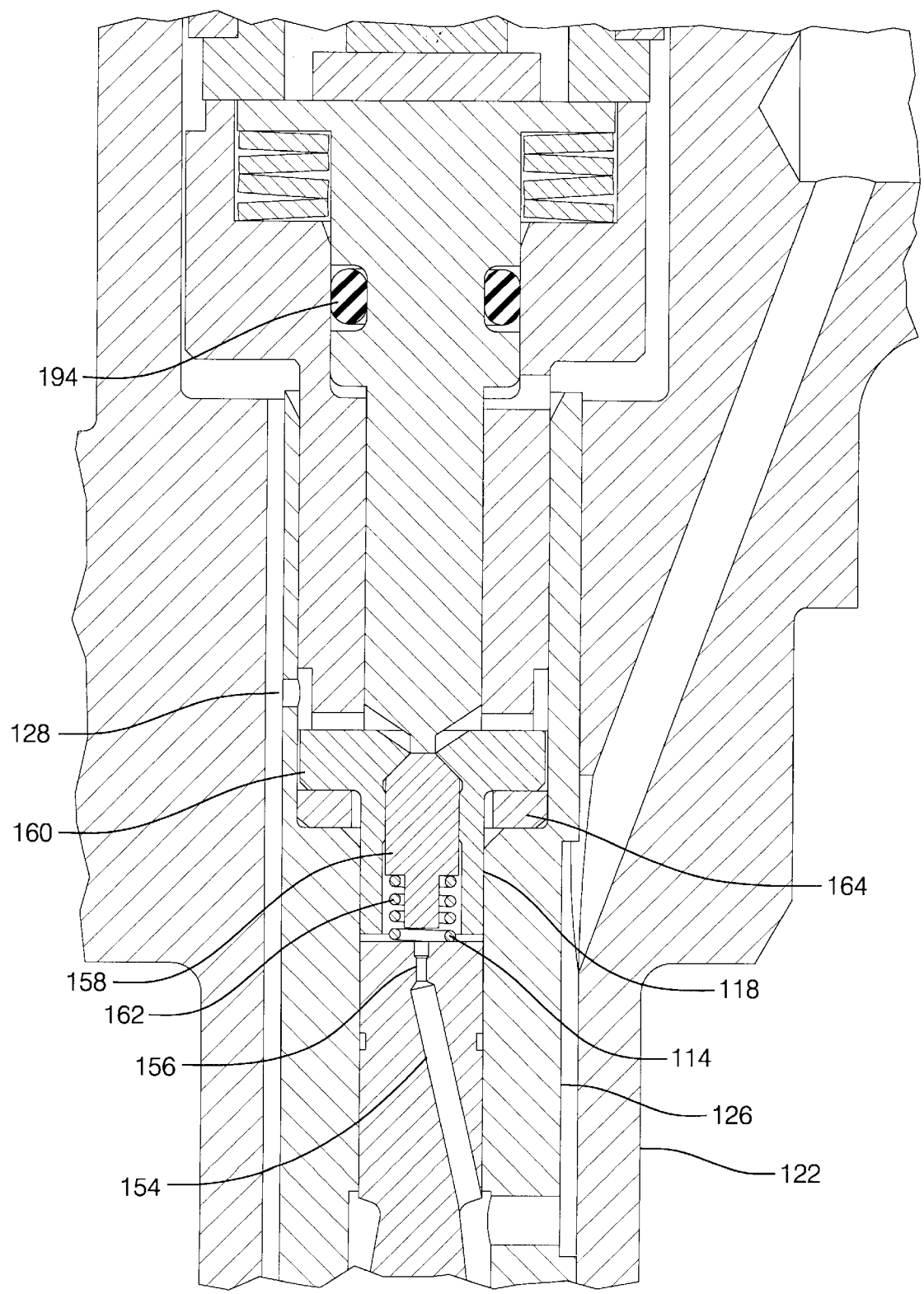
FIG. 6 is a fragmentary cross-sectional view of the second exemplary piezoelectric actuated fuel injector.
Figure 7:
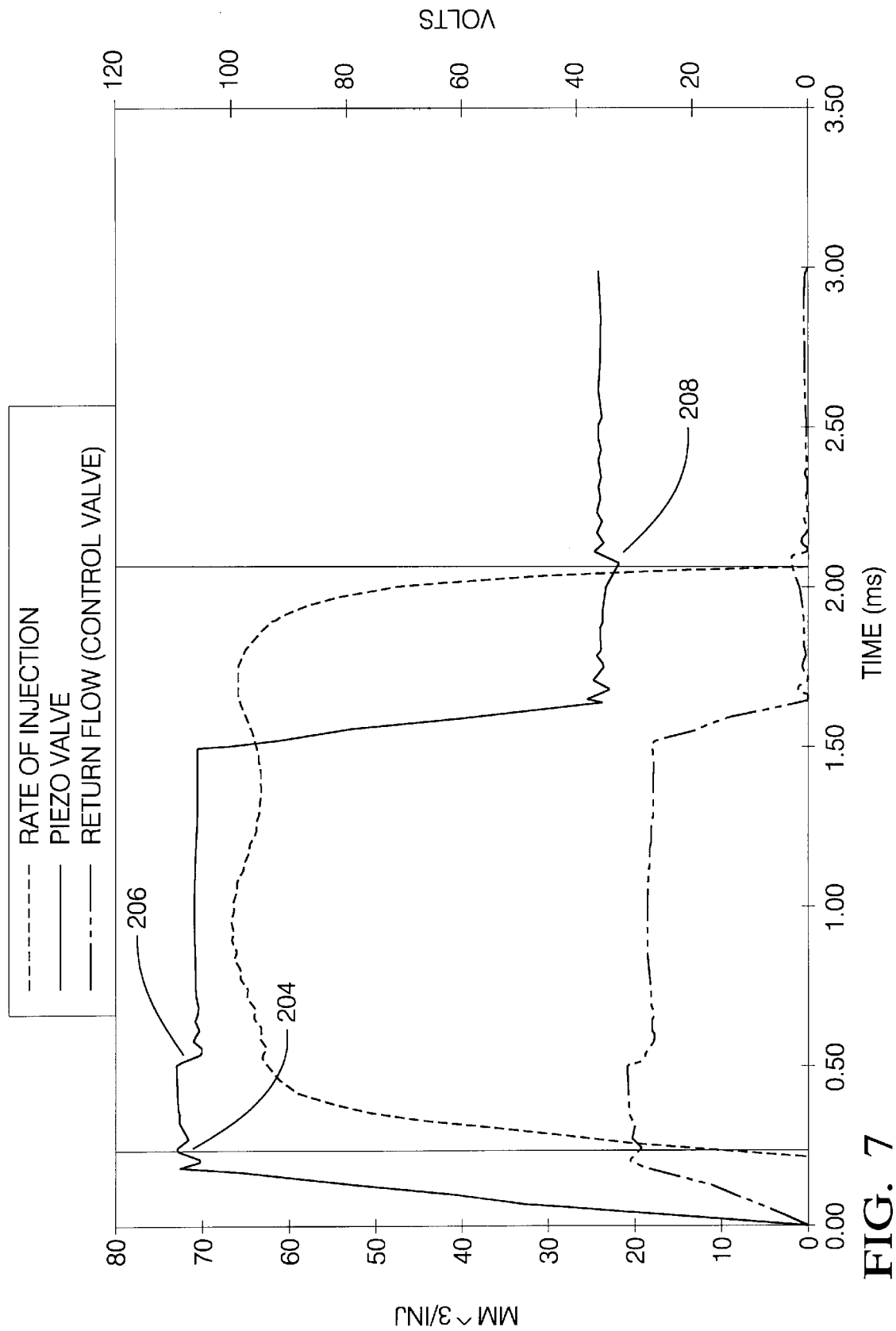
FIG. 7 is a graph illustrating the voltage associated with a piezoelectric actuator during an injection event in the second piezoelectric actuated fuel injector.

A second exemplary piezoelectric actuated fuel injector 110 is depicted in FIG. 5. The fuel injector 110 generally includes an injector body 112 having an axially extending fuel passage therein, a control chamber 114 disposed within the injector body 112, and an injector valve 116 axially movable within the fuel passage in accordance with the fuel pressure in the control chamber 114. In this case, the injector valve 116 is not directly actuated by a piezoelectric actuator. Rather, a control valve assembly 118 selectively connects the control chamber 114 to a low pressure fuel return circuit in order to reduce fuel pressure in the control chamber 114, thereby axially moving the injector valve 116.

More specifically, the injector body 112 is comprised of a body housing 122 and a body insert 124 that are joined by means of a thermally assisted diametral interference fit. The body insert 124 includes localized flats on the joining diameter that form individual passages 126 and 128 after assembly with the body housing 122. The individual passages 126 and 128 conduct pressurized fuel into the injector and unpressurized fuel back through an outlet port 130 to the fuel return system (not shown), respectively. The injector body 110 further includes a fuel filter 132 that is press fit into a fuel inlet port 134.

The needle-type injector valve 116 is diametrally mated at one end to the injector body and at the other end to a spray tip 136. A hollow dowel 140 may be used to assure adequate alignment of the spray tip 136 and the injector body 112. The spray tip 136 centrally guides the injector valve 116, thereby assuring a positive liquid seal between the sealing angle at the end of the injector valve 116 and the valve seat 138 of the spray tip 136. In addition, the mated fit between the injector valve 116 and the spray tip 136 further defines a calibrated restrictive fuel passage 142, such that fuel flows through the passage 142 when the injector valve 116 is axially separated from the valve seat 138. In order to prevent leakage of fuel into the combustion chamber, a spring 144 may also be installed between the injector valve 116 and the injector body 112. In this way, the injector valve 116 maintains sealing contact with the valve seat 138 when the fuel system is not pressurized and/or when fuel delivery is not required. To prevent external fuel leakage, a threaded nut 146 may be used to hold the spray tip 136 in intimate contact with the injector body 112.

A control valve assembly 118 is installed into the injection body 112 at the end of the injector valve 116 opposite the valve seat 138. A control chamber 114 is bounded by the control valve assembly 118. In order to actuate the injector valve 116, the control chamber 114 is filled with a working fluid (e.g., the fuel for the engine) and placed in fluid communication with the injector valve 116. In this preferred embodiment, the working fluid is provided by a passageway 154 that leads from the fuel inlet port 134 through a control orifice 156 and discharges into the control chamber 114.

The control valve assembly 118 further includes an outwardly opening (i.e., against the direction of fuel flow) control valve 158 that is closely mated to a control valve seat 160. The control valve 158 is held in sealing position against the control valve seat 160 by the fuel pressure within the control chamber 114. When the fuel pressure is absent, the control valve 158 may be held in sealing position by a spring 162. It is envisioned that other elastic members may be suitable used in place of the spring. A calibrated spacer 164 is used to control the gap between the end of the control valve seat and the injector valve 116, thereby establishing the stroke length for the injector valve 116. To prevent fuel leakage from the control chamber 114, the control valve assembly 118 is press fit into the mated diameter of the injector body 112.

A piezoelectric actuator 170 is used to actuate the control valve 158. The piezoelectric actuator 70 is positioned in the upper portion of the injector body 112. The piezoelectric actuator 170 is then securely affixed into the injector body 112 by way of a threaded cap 174. A seal ring 176 may also be provided between the threaded cap 174 and the injector body 112 to prevent fuel leakage.

The piezoelectric actuator 170 is generally comprised of a piezoelectric element 178, piezo housing 180, a push rod 182, and a push rod housing 184. More specifically, a piezo housing 180 is placed adjacent to a push rod housing 184 which abuts against the control valve seat 160. The piezoelectric element 178 is equipped with suitably insulated terminals 186 for the applying voltage thereto, an adjusting screw 188 for manually minimizing assembly lash, and appropriate upper and lower plates 190 and 192 for force transmission. The position of the piezoelectric element 178 is adjusted by way of the screw 188 to minimize the gap between the push rod 182 and the control valve 158. Another seal ring 194 may be positioned between the push rod 182 and the its housing 184 to prevent fuel from entering the piezo housing 180. In addition, a conical spring washer 196 may be positioned between the flange of the push rod 182 and the push rod housing 184 in order to pre-load the piezoelectric element 178.

Again, injection events may be detected by monitoring the voltage associated with the piezoelectric actuator 170. In this embodiment, when the control valve 158 is not in contact with the control valve seat 160, a mechanical load is exerted by the fluid pressure in the control chamber onto the control valve 158 which is in turn transmitted to the piezoelectric actuator 170. As will be apparent to one skilled in the art, an electronic driver for the piezoelectric actuator 170 provides a low output impedence during the time when the voltage associated with the piezoelectric actuator 170 is being driven to a target voltage level. Once the target voltage is reached, the electronic driver will switch to a high impedence state which allows the voltage to change if there is a change in the mechanical load exerted on piezoelectric actuator 170. Thus, the voltage associated with the piezoelectric actuator 170 is proportionally affected by the mechanical load exerted on the piezoelectric actuator 170. In this way, changes in the fluid pressure in the control chamber are detectable as changes in the voltage retained by the piezoelectric actuator 170.

In operation, high pressure fuel is delivered through the inlet port 134 from a pressurized plenum of the fuel delivery system (not shown). The fuel flow path proceeds through the fuel filter 132 to a point where the flow path is divided into two separate circuits. In the fuel delivery circuit, fuel flows through the annular passages surrounding the injector valve to the discharge opening in the valve seat 138. The passageways 126 and 128 are sized to produce a specific known pressure loss when the injector valve 116 is opened. In the control circuit, fuel flows though a drilled passage in the injector valve 116 through the control orifice 156 and into the control chamber 114. When the piezoelectric actuator 170 is not energized, the control valve 158 is held firmly in contact with the control valve seat 160 by the high pressure fuel, thereby preventing leakage to the fuel return port.

To initiate fuel injection, an appropriate voltage is applied to the terminals of the piezoelectric actuator 170. Once charged, the voltage source is disconnected from the piezoelectric actuator 170. In response, the piezoelectric actuator 170 expands longitudinally, thereby actuating the push rod 182 which in turn causes the control valve 158 to axially separate from the control valve seat 160. When the control valve 158 opens, fuel escapes to the low pressure fuel return circuit.

As the pressure in the control chamber reaches some threshold level, the injection valve 116 begins to axially separate from the valve seat 138 of the spray tip 136. The motion of the injection valve 116 reduces the volume of the control chamber 114, thereby increasing the control chamber pressure and the load on the control valve 158. Accordingly, there is an increase in the piezo voltage as shown at 204. The time at which the piezo voltage begins to increase corresponds to the time at which the injection valve begins to move away from the valve seat, and thus signifies the beginning of fuel injection into the engine combustion chamber.

As the injection valve 116 continues moving away from the valve seat 138, the control chamber pressure gradually increases. This is detectable as a gradual increase in the piezo voltage. When the injection valve 116 contacts the bottom surface of the control valve seat 160, the injection valve 116 motion is terminated. As a result, the control chamber pressure is reduced which in turn decreases the piezo voltage as shown at 206. This reduction in piezo voltage signifies the end of the movement of the injection valve 116.

To complete injection, the voltage charge on the piezoelectric actuator 170 is dissipated to a lower voltage level sufficient to initiate closure of the injection valve. However, the voltage charge on the piezoelectric actuator 170 is not completely discharged. If the voltage charge was completely discharged, then the control valve 158 would move into contact with the control valve seat 160, such that the force of control chamber pressure would be absorbed by the control valve seat 160. In other words, the control chamber pressure would no longer be exerted through the control valve 158 to the piezoelectric actuator 170. In this case, the piezoelectric actuator 170 could not be used to detect changes in the control chamber pressure. In accordance with the present invention, the piezoelectric actuator 170 retains sufficient voltage so that the control valve 158 is not sitting on the control valve seat 160.

As the longitudinal growth of the piezoelectric actuator 170 is retracted, the control valve 158 moves towards resealing against the control valve seat 160, thereby increasing the control chamber pressure to a level that begins to close the injection valve 116. During the closure motion of the injection valve 116, a gradual reduction in control chamber pressure is detected as a gradual reduction in the piezo voltage. When the injection valve 116 seals against the valve seat 138 of the spray tip 136, there is an increase in the control chamber pressure. Accordingly, the piezo voltage increases as shown at 208. This increase in piezo voltage signifies closure of the injection valve and thus the end of fuel injection. Once the injection valve is closed, the piezoelectric actuator 170 is shorted to ground, thereby removing any residual voltage from the piezoelectric actuator 170. Lastly, the control valve 158 is firmly sealed against the control valve seat 160.

In either of these two embodiments, the piezoelectric actuator may provide an additional pair of terminals, where one pair of terminals is connected to a voltage source and the other pair of terminals is connected to the injection event detector. In this case, the second pair of terminals is positioned across a portion of the piezoelectric actuator and is only used to detect voltage changes in the piezoelectric actuator. In this way, the signal-to-noise ratio may be improved, thereby improving the accuracy of the injection event methodology. In this alternative approach, the methodology is otherwise as described above.

While the above description constitutes the preferred embodiment of the invention, it will be appreciated that the invention is susceptible to modification, variation, and change without departing from the proper scope or fair meaning of the accompanying claims.

What is claimed is:

1. A method for detecting injection events in a piezoelectric actuated fuel injector, the fuel injector including an injector body having an axially extending fuel passage therein and an injector valve axially movable within the fuel passage, said method comprising the steps of:

providing a piezoelectric element for actuating the injector valve;

providing a movable control member between the piezoelectric actuator and the injector valve;

applying a voltage to the piezoelectric element such that a longitudinal growth of the piezoelectric element causes the injector valve to engage with its seating, thereby preventing fuel flow from the fuel injector;

reducing a voltage applied to the piezoelectric element to move the movable member to change a fluid volume and fluid pressure acting on the movable member for actuating the injector valve to separate with its seating, thereby allowing fuel flow from the fuel injector; and monitoring at least one of the voltage or current associated with the piezoelectric element, wherein the voltage or current is indicative of injection events in the fuel injector.

2. A method for detecting injection events in a piezoelectric actuated fuel injector, the fuel injector including an injector body having an axially extending fuel passage therein and an injector valve axially movable within the fuel passage, said method comprising the steps of:

providing a piezoelectric element for actuating the injector valve;

energizing the piezoelectric element for causing the injector valve to engage with its seating, thereby preventing fuel flow from the fuel injector, and reducing a voltage applied to the piezoelectric element for actuating the injector valve to separate with its seating, thereby allowing fuel flow from the fuel injector;

monitoring at least one of the voltage or current associated with the piezoelectric element, wherein the voltage or current is indicative of injection events in the fuel injector; and wherein the step of monitoring the voltage or current associated with the piezoelectric element further comprises detecting changes in at least one of the voltage or the current that are caused by changes in the fluid pressure exerted on the piezoelectric element, such that the voltage or current changes are indicative of injection events in the fuel injector.

3. A method for detecting injection events in a piezoelectric actuated fuel injector, the fuel injector including an injector body having an axially extending fuel passage therein and an injector valve axially movable within the fuel passage, said method comprising the steps of:

providing a piezoelectric element for actuating the injector valve;

controlling a voltage applied to the piezoelectric element, thereby actuating the injector valve;

monitoring at least one of the voltage or current associated with the piezoelectric element, wherein the voltage or current is indicative of injection events in the fuel injector;

providing a control chamber for storing a working fluid in the injector body, wherein the injector valve is movable in accordance with the fluid pressure in the control chamber and the piezoelectric element axially expands in order to control the fluid volume of the control chamber; and fixing a valve seat with a discharge opening therethrough at an outlet end of the fuel passage, wherein said injection valve sealingly engages the valve seat in a closed position and axially separates from the valve seat in an open position.

4. The method of claim 3 further comprising the steps of:

applying a voltage to the piezoelectric element that maintains the injector valve in sealing engagement with the valve seat;

decreasing the voltage applied to the piezoelectric element, such that the injector valve axially separates from the valve seat, thereby allowing fuel flow from the fuel injector; and detecting a change in either the voltage or current discharge rate associated with the piezoelectric element that is indicative of the injector valve axially separating from the valve seat.

5. A method for detecting injection events in a piezoelectric actuated fuel injector, the fuel injector including an injector body having an axially extending fuel passage therein and an injector valve axially movable within the fuel passage, said method comprising the steps of:

providing a piezoelectric element for actuating the injector valve;

energizing the piezoelectric element for causing the injector valve to engage with its seating, thereby preventing fuel flow from the fuel injector, and reducing a voltage applied to the piezoelectric element for actuating the injector valve to separate with its seating, thereby allowing fuel flow from the fuel injector;

monitoring at least one of the voltage or current associated with the piezoelectric element, wherein the voltage or current is indicative of injection events in the fuel injector;

providing a control chamber in fluid communication with a low pressure fuel return circuit, and a control valve operable to selectively connect the control chamber to the low pressure circuit in order to reduce fuel pressure in the control chamber, such that the injector valve is movable in accordance with the fluid pressure in the control chamber; and positioning a control valve seat between the control chamber and the low pressure circuit, wherein the control valve sealingly engages the valve seat in a closed position and axially separates from the control valve seat in an open position.

6. A method for detecting injection events in a piezoelectric actuated fuel injector, the fuel injector including an injector body having an axially extending fuel passage therein and an injector valve axially movable within the fuel passage, said method comprising the steps of:

providing a piezoelectric element for actuating the injector valve;

controlling a voltage applied to the piezoelectric element, thereby actuating the injector valve;

monitoring at least one of the voltage or current associated with the piezoelectric element, wherein the voltage or current is indicative of injection events in the fuel injector;

providing a control chamber in fluid communication with a low pressure fuel return circuit, and a control valve operable to selectively connect the control chamber to the low pressure circuit in order to reduce fuel pressure in the control chamber, such that the injector valve is movable in accordance with the fluid pressure in the control chamber;

positioning a control valve seat between the control chamber and the low pressure circuit, wherein the control valve sealingly engages the valve seat in a closed position and axially separates from the control valve seat in an open position; and fixing a valve seat with a discharge opening therethrough at an outlet end of the fuel passage, wherein said injection valve sealingly engages the valve seat in a closed position and axially separates from the valve seat in an open position, thereby allowing fuel flow from the fuel injector; and detecting an increase in the voltage associated with the piezoelectric element that is indicative of the injection valve axially separating from the valve seat.

7. A method for detecting injection events in a piezoelectric actuated fuel injector, the fuel injector includes an injector body having an axially extending fuel passage therein and an injector valve axially movable within the fuel passage, comprising the steps of providing a piezoelectric actuator for actuating a control valve and control chamber in fluid communication with a pressurized fuel source, where the control valve controls the fuel pressure in the control chamber;

applying a voltage to the piezoelectric actuator, such that the longitudinal growth of the piezoelectric actuator causes the injector valve to engage with its seating, thereby preventing fuel flow from the fuel injector;

reducing a voltage applied to the piezoelectric actuator, such that a reduction in the longitudinal length of the piezoelectric actuator results in movement of the control valve for causing the injector valve to separate with its seating, thereby allowing fuel flow from the fuel injector;

monitoring at least one of the voltage or the current associated with the piezoelectric actuator, wherein changes in voltage or current are indicative of injection events in the fuel injector.

8. The method of claim 7 wherein the step of monitoring the voltage or current associated with the piezoelectric actuator further comprises detecting changes in the voltage or the current that are caused by changes in the fuel pressure in the control chamber that is exerted through the control valve to the piezoelectric actuator.

9. The method of claim 7 further comprises the step of controlling the fuel pressure in the control chamber by selectively connecting the control chamber to a low pressure fuel return circuit, thereby axially moving the injector valve within the fuel passage.

10. The method of claim 9 further comprises the steps of positioning a control valve seat between the control chamber and the low pressure circuit, wherein the control valve sealingly engages the control valve seat in a closed position and axially separates from the control valve seat in a open position.

11. A method for detecting injection events in a piezoelectric actuated fuel injector, the fuel injector includes an injector body having an axially extending fuel passage therein and an injector valve axially movable within the fuel passage, comprising the steps of providing a piezoelectric actuator for actuating a control valve and control chamber in fluid communication with a pressurized fuel source, where the control valve controls the fuel pressure in the control chamber;

applying a voltage to the piezoelectric actuator, such that the longitudinal growth of the piezoelectric actuator actuates the control valve; and monitoring at least one of the voltage or the current associated with the piezoelectric actuator, wherein changes in voltage or current are indicative of injection events in the fuel injector;

wherein the step of monitoring the voltage or current associated with the piezoelectric actuator further comprises detecting changes in the voltage or the current that are caused by changes in the fuel pressure in the control chamber that is exerted through the control valve to the piezoelectric actuator;

controlling the fuel pressure in the control chamber by selectively connecting the control chamber to a low pressure fuel return circuit, thereby axially moving the injector valve within the fuel passage;

positioning a control valve seat between the control chamber and the low pressure circuit, wherein the control valve sealingly engages the control valve seat in a closed position and axially separates from the control valve seat in an open position; and fixing a valve seat with a discharge opening therethrough at an outlet end of the fuel passage, wherein the injection valve sealingly engages the valve seat in a closed position and axially separates from the valve seat in an open position, thereby allowing fuel flow from the fuel injector; and detecting an increase in the voltage associated with the piezoelectric actuator that is indicative of the injection valve axially separating from the valve seat.

12. The method of claim 11 further comprising the steps of:

detecting a gradual increase in the voltage associated with the piezoelectric actuator as the injection valve axially separates from the valve seat; and detecting an abrupt decrease in the voltage associated with the piezoelectric actuator that is indicative of the termination of the movement of the injection valve.

13. The method of claim 11 further comprising the steps of:

discharging at least a portion of the voltage associated with the piezoelectric actuator, such that the control valve moves towards the closed position but does not engage the control valve seat;

detecting an abrupt decrease in the voltage associated with the piezoelectric actuator;

detecting gradual decrease in the voltage associated with the piezoelectric actuator that is indicative of the control valve sealingly engaging the control valve seat; and detecting an increase in the voltage associated with the piezoelectric actuator that is indicative of the injection valve sealingly engaging the valve seat.

* * * * *